United States Patent
Dao et al.

(10) Patent No.: US 11,853,740 B2
(45) Date of Patent: Dec. 26, 2023

(54) METHOD FOR PATCHING AN OPERATING SYSTEM ON A SECURE ELEMENT TRANSPARENTLY THROUGH AN SM-SR PLATFORM

(71) Applicant: THALES DIS FRANCE SAS, Meudon (FR)

(72) Inventors: Frédéric Dao, La Ciotat (FR); Gerald Glinka-Hecquet, La Ciotat (FR); Denis Dubois, La Ciotat (FR); Jérôme Duprez, La Ciotat (FR)

(73) Assignee: THALES DIS FRANCE SAS, Meudon (FR)

( * ) Notice: Subject to any disclaimer, the term of this patent is extended or adjusted under 35 U.S.C. 154(b) by 263 days.

(21) Appl. No.: 17/599,647

(22) PCT Filed: Mar. 31, 2020

(86) PCT No.: PCT/EP2020/059179
§ 371 (c)(1),
(2) Date: Sep. 29, 2021

(87) PCT Pub. No.: WO2020/201313
PCT Pub. Date: Oct. 8, 2020

(65) Prior Publication Data
US 2022/0164178 A1 May 26, 2022

(30) Foreign Application Priority Data
Apr. 1, 2019 (EP) .................................... 19305429

(51) Int. Cl.
*G06F 8/65* (2018.01)
*H04W 12/30* (2021.01)
(Continued)

(52) U.S. Cl.
CPC ............ *G06F 8/65* (2013.01); *H04L 63/0853* (2013.01); *H04L 67/34* (2013.01); *H04W 12/35* (2021.01); *H04W 12/40* (2021.01)

(58) Field of Classification Search
None
See application file for complete search history.

(56) References Cited

U.S. PATENT DOCUMENTS

2014/0143534 A1 5/2014 Chastain
2016/0021529 A1 1/2016 Park et al.
(Continued)

FOREIGN PATENT DOCUMENTS

CN 108702386 A 10/2018
WO 2018227729 A1 12/2018

OTHER PUBLICATIONS

International Search Report (PCT/ISA/210) and Written Opinion (PCT/ISA/237) dated Jun. 8, 2020, by the European Patent Office as the International Searching Authority for International Application No. PCT/EP2020/059179 (WO2020/201313)—[12 pages].
(Continued)

*Primary Examiner* — Qing Chen

(57) ABSTRACT

Provided is a method for patching an operating system 100 on a secure element 103 embedded in a terminal. The method comprises transmitting from a platform 101 to a SM-SR 102 an order to create on the secure element 103 an ISD-P 104, establishing between the platform 101 and the ISD-P or the secure element 103 a secure channel, transmitting from the SM-SR 102 to the secure element 103 a patch of the operating system, executing in the ISD-P 104 the patch of the operating system, and sending from the secure element 103 to the platform 101 a message informing the platform 101 of the result of the execution of the patch.

13 Claims, 1 Drawing Sheet

(51) Int. Cl.
  *H04W 12/40* (2021.01)
  *H04L 9/40* (2022.01)
  *H04L 67/00* (2022.01)

(56) References Cited

U.S. PATENT DOCUMENTS

| | | | |
|---|---|---|---|
| 2017/0127264 A1 | 5/2017 | Yang | |
| 2019/0065749 A1 | 2/2019 | Yang | |
| 2019/0394053 A1* | 12/2019 | Yu | H04L 63/062 |
| 2020/0034137 A1* | 1/2020 | Zhang | H04W 12/35 |
| 2020/0374686 A1* | 11/2020 | Zhang | H04L 67/30 |

OTHER PUBLICATIONS

Examination Report from JP Patent Office for co-pending patent Application N°JP2021-555860 and English translation (5 pages).

\* cited by examiner

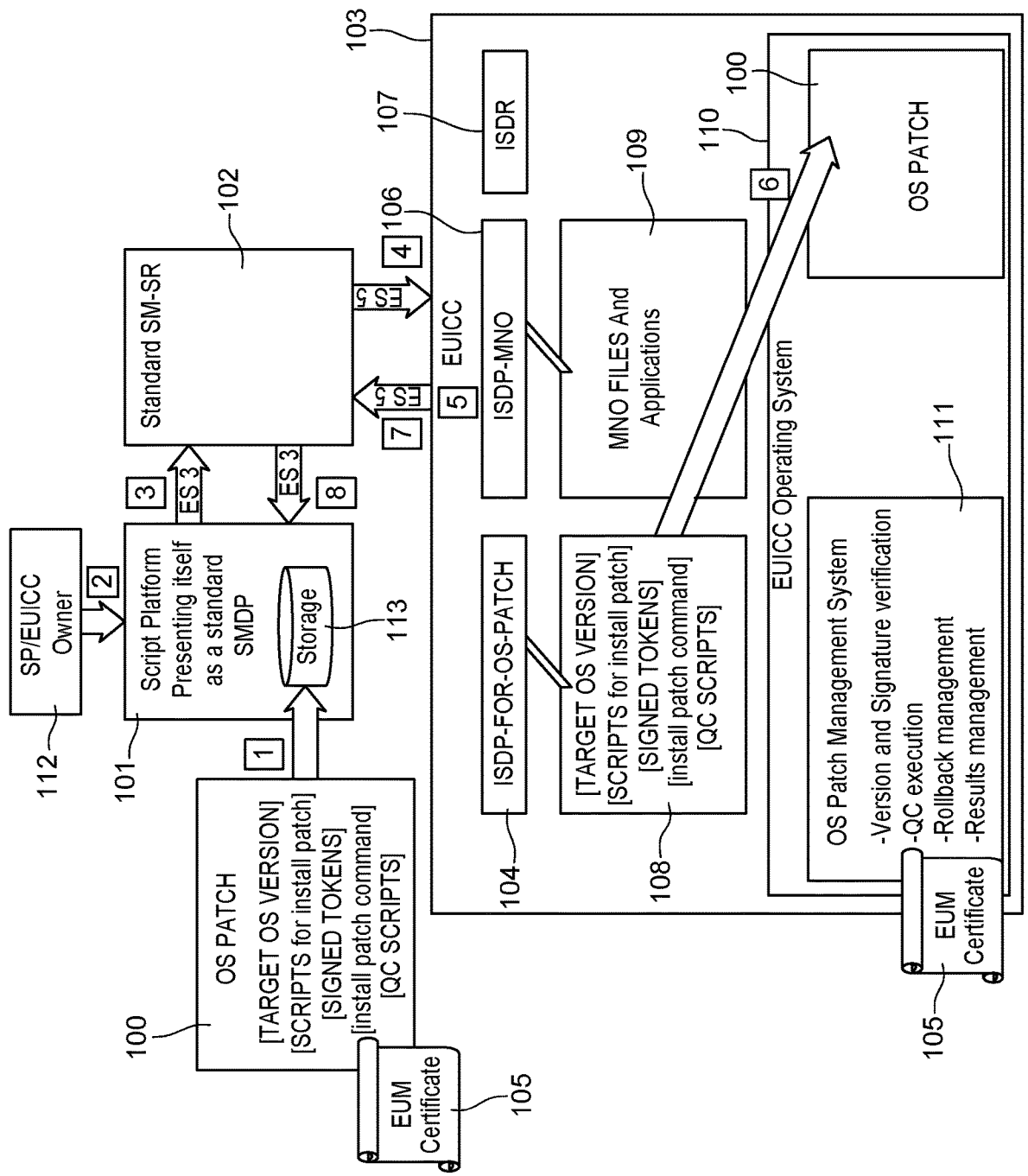

METHOD FOR PATCHING AN OPERATING SYSTEM ON A SECURE ELEMENT TRANSPARENTLY THROUGH AN SM-SR PLATFORM

BACKGROUND

Field

The present invention concerns telecommunications in cellular networks (3G (UMTS)), 4G networks (LTE) or future 5G networks).

INTRODUCTION

A particular goal of these cellular networks is to help establish communications between terminals communicating with secure elements (embedded UICCs also called eUICCs or integrated UICCs, also called integrated eUICCs).

These secure elements are usually in the form of removable cards of their terminals, usually consisting of mobile phones, smartphones, PDAs, etc. There are also secure elements integrated in modems part terminals or machines (therefore non-extractable), these machines being vehicles, beverage vending machines, electrical counters, etc.

SUMMARY

The invention concerns the patch ability of such secure elements.
A GSMA compliant eUICC or integrated eUICC (secure elements in the following description) is soldered to devices and deployed on the field. It is managed by a set of well identified OTA platforms (SM-SR/SM-DP). A SM-SR is a Subscription Manager Secure Routing and a SM-DP is a Subscription Manager Data Preparation (SM-DP). The SM-DP is the entity which operators use to securely encrypt their operator profiles (a profile being a set of file system, applications, and credentials) ready for over the air installation within the secure element through the SM-SR. The SM-SR securely delivers the encrypted operator profile to the secure element and then, once the profile are installed, remotely manages the secure element thereafter (enable, disable and delete the profile as necessary during the product's lifetime).
Maintenance of the operating system and of the content of the secure element requires an OTA (Over the Air) connectivity.
The GSMA specifications allow proprietary EUM (secure element manufacturer) methods to patch a secure element OS (Operating System), but a EUM generally doesn't own one of the identified platforms above (SM-SR/SM-DP). And the identified platforms do not have management of OS patches in their scope.
Indeed, an EUM could team up with a platform provider, but that requires to customize the platform for the proprietary EUM method of patching.
Some existing solutions for solving this problem exist:
  Implement the proprietary EUM method of patch in each platform where this EUM's secure elements may be managed. This represents N problems for the EUM whose secure elements are managed by N platforms, but also M problems for the platform owner who manages secure elements from M different EUMs that implement M different OS updates. And this represents consecutively M×N problems for the customer owning fleets of devices of several EUMs and managed through several platforms.
  Implement the proprietary EUM method in an OTA platform owned by the EUM. But this causes many contractual issues as this adds another platform to the set of identified platforms, and technical issues of synchronizations of those multiple platforms.
The present invention proposes a solution to these problems.

BRIEF DESCRIPTION OF THE DRAWINGS

FIG. 1 represents a preferred method.

DETAILED DESCRIPTION

While the specification concludes with claims defining the features of the invention that are regarded as novel, it is believed that the invention will be better understood from a consideration of the following description in conjunction with the drawing figures.
A list of acronyms referenced herein is provided:
ECASD—eUICC Controlling Authority Security Domain
eUICC—embedded UICC
EUM—secure element manufacturer
ISD-R—Issuer Security Domain Root
MNO—Mobile Network Operator
OTA—Over the Air
SM-SR—Subscription Manager Secure Routing.
SM-DP—Subscription Manager Data Preparation
The invention proposes a method for patching an operating system on a secure element embedded in a terminal, the method comprising:
  i—Transmitting from a platform to a SM-SR an order to create on the secure element a ISD-P;
  ii—Establishing between the platform and the ISD-P or the secure element a secure channel;
  iii—Transmitting from the SM-SR to the secure element a patch of the operating system;
  iv—Executing in the ISD-P the patch of the operating system;
  v—Sending from the secure element to the platform a message informing the platform of the result of the execution of the patch.
Preferably, the platform is a SM-DP.
Advantageously, step-i—is executed before step-ii—and the SM-SR is a standard SM-SR and the secure channel is established between the platform and the ISD-P.
The secure element is a eUICC or an integrated eUICC.
Preferably, the patch contains at least one signature to be verified by the secure element. Advantageously, the least one signature can be verified by a key present in an MNO Profile.
Other particularities and advantages of the invention will appear when reading an advantageous embodiment of the invention, which is given as an illustration and not a limitation, and referring to the appended unique FIGURE that represents a preferred method according to the invention.
In this FIGURE, several elements are represented:
  A OS patch 100 stored in a memory 113 of a script platform 101 that contains scripts for installing OS patches with signed tokens 105 (for example those known as EUM certificates 105) install patch commands (with eventually QC scripts, QC standing for "Quality Control"), and optionally a target OS version. The OS patches can be stored in this memory 113 or be generated on the fly. The elements 100 and 101 that are directly linked can constitute a same entity. The script platform 101 can be considered as a standard SM-DP in view of a Service Provider SP or a secure element owner 112. It is merely considered as a SM-DP from the point of view of the SM-SR. The Subscription Manager Data Preparation (SM-DP) 101 is the entity which operators use to securely encrypt their operator credentials ready for over the air installation within the secure element.

A secure element 103 like a eUICC for example or an integrated eUICC (i-UICC).

A standard Subscription Manager Secure Routing (SM-SR) 102: This entity securely delivers the encrypted operator profile to a secure element 103 and then, once the profile is installed, remotely manages the secure element thereafter (to enable, disable and delete the profile as necessary during the product's lifetime), The secure element or the eUICC 103 comprises an ISD-P (secure domain) 104 for the OS patch 100 (its creation will be explained below), an ISDP-MNO 106 (ISD-P created to host the Mobile Network Operator profile), and an ISD-R 107 (Issuer Security Domain-Root). The secure element 103 so comprises an ISD-P 104 for the OS patch 100, this ISD-P 104 being able to process a program or a script dedicated to install a new patch in the secure element 103.

A MNO files and applications repertory 109 classically integrated in a secure element;

The eUICC 103 also comprises an Operating System 110, the latter comprising an OS patch management system 111 that is foreseen for:
Verifying the version of the patch and of its signature;
Execute the OS patch script;
QC scripts execution;
Rollback management intended to cancel the installation of the OS patch is something wrong happens during the installation of the OS patch;
Results management for informing the script platform 103 if the patch has been correctly installed.

And finally the OS patch 100 installed in the secure element 103 by the script platform 101 like explained hereinafter.

The script platform 101 behaves like a standard SM-DP in its interface to the SM-SR.

The standard SM-SR platform 102 is linked between the script-platform 101 and the secure element 103.

A Service provider or secure element owner 112 that provides information to the script platform 101, such as when to send an OS patch to a secure element via an SM-SR, and which SM-SR is managing the secure element.

These different devices having been described, a preferred method of implementing the invention will now be explained:

The EUM or some service provider owns or subcontracts the script platform 101 that can generate or format scripts to patch the operating system 110. The script platform 101 doesn't have OTA connectivity with the EUM's secure elements The script platform 101 implements a north-bound ES3 interface. That is, the script platform 101 can be integrated with the SM-SR 102, and appears as an SM-DP.

When the EUM or service provider decides to send a patch to the target secure element 103, the steps are the followings, as represented:

1—The EUM can send the OS patch to the script platform 101 or give instructions to this script platform 101 to generate on the fly an OS patch, and optionally signed tokens;

2—the EUM, or the UICC owner 112, or a Service Provider or MNO having rights to request installation of patches on the secure element 103, requests the script platform 101 to install the patch script on this secure element 103.

Then, three following steps:
3a—the script platform 101 contacts the SM-SR 102 that manages the targeted secure element 103 and requests to create the ISD-P (ES3.CreateISDP) 104;
3b—the script platform 101 performs ISD-P key establishment with the ISD-P 104 on the secure element 103 through the SM-SR 102 (ES8.ISDPKeysetEstablishment through ES3.SendData). This generates an SCP03 keyset known only by the script platform 101 and the ISD-P 104 that can be used to secure SCP03 or SCP03t scripts.
3c—the script platform 101 generates or formats the script, adds one or more signed tokens in it, and secures it using SCP03 or SCP03t (see below description of script and of signed tokens);
3d—the script platform 101 sends the secured script to the SM-SR 102 using ES3.sendData (the SM-SR 102 cannot see the content of the script, only the ciphered version).

4—the SM-SR 102 sends the script to the secure element 103;

5/6—the script is executed in the ISD-P 104. Depending on the proprietary method in the script, the execution of the script installs the patch immediately in the OS 100, or stores it for later activation;

7/8—the script platform 101 is informed of the result of the script's execution or storage for details and refinements:

1) The Script can Consist of Either:
regular APDUs, plus optionally proprietary APDUs, secured using SCP03
OR
proprietary commands, concatenated and secured with SCP03t. In this case the for example first command is a proprietary command indicating the nature of the script (e.g. "InstallOSPatch") instead of a SIMAlliance Profile Package ProfileHeader
OR
a regular SIMAlliance Profile Package, secured with SCP03t, that contains a proprietary EF (Elementary File) which will itself contain proprietary commands.
In all cases, the script may contain at the end a few instructions of Quality Control (QC) that allow to check that the script is correctly executed/stored
OR
a regular SIMAlliance Profile Package, secured with SCP03t, that contains a PE-NonStandard which will itself contain proprietary commands.

2) Signed Tokens
The script platform 101 may insert signed tokens in the script. Thus will allow the secure element to verify that the script has been authorized by one or more actors, as described below:
One token may be a DLOA (Digital Letter Of Approval), issued by a certification authority, that delivers DLOA only after verifying compliance, and verified by the certification authority's PK stored in the secure element's ECASD (eUICC Controlling Authority Security Domain) in order to ensure that only scripts that have undergone a security certification are executed.

One token may be a signature using a shared key or a key pair known only by the EUM, for example, signed by the EUM's SK.EUM.ECDSA (see also in point 3) or the SK.ECASD.ECDSA known by the EUM, and verified with the corresponding PK stored in the secure element's ECASD in order to ensure that only scripts generated by the EUM system are executed.

One token may be multiply-signed by each of the MNO which owns a Profile installed on this secure element, and verified using the corresponding PK stored in a well-known keyset version number and key index in each ISD-P or MNO profile, in order to ensure that only scripts approved by the MNOs involved are executed.

One token may be signed by a $3^{rd}$ party's key in case the script is generated by a service provider, and verified using a key stored in the ECASD or in the service provider's Security Domain in order to guaranty that only known $3^{rd}$ parties have access to the script.

3) Additional Controls:

The secure element may check that the certificate identifies a well-known and allowed script platform (for example, by checking the OID (Object Identifier) of the platform's certificate presented during the keyset establishment);

The script may specify an OS version, and the secure element would check if the version matches its current status, and reject the script if not;

The advantage of the invention is that the SM-SR 102 doesn't need any proprietary feature. As soon as it can interact with a SM-DP, it can interact transparently with the script platform 101.

This invention is compatible to the GSMA eUICC specifications M2M: SGP.02 any version.

Finally, at least one signature can be verified by a key present in an MNO Profile. The MNO Profile is stored in the MNO security domain (106 or 109) and verified by the secure element 103.

The invention claimed is:

1. A method for patching an operating system (OS) on a secure element embedded in a terminal, the method comprising:

transmitting an order to create an Issuer Security Domain-Profile (ISD-P) on the secure element from a script platform to a Subscription Manager Secure Routing (SM-SR);

establishing a secure channel between the script platform and the ISD-P or the secure element a secure channel;

performing ISD-P key establishment with the ISD-P on the secure element through the SM-SR, thereby generating a keyset known only by the script platform and the ISD-P to secure one or more scripts;

formatting the one or more scripts, adding one or more signed tokens in the one or more scripts, and securing the one or more scripts to produce one or more secured scripts;

sending the one or more secured scripts to the SM-SR which then sends the one or more secured scripts to the secure element;

executing the one or more secured scripts in the ISD P, wherein the execution of the one or more secured scripts install a patch in the OS; and sending a message informing the script platform of a result of the execution of the one or more secured scripts from the secure element to the script platform.

2. The method according to claim 1, wherein ail the script platform is a Subscription Manager Data Preparation (SM-DP).

3. The method according to claim 1, wherein ail the step of transmitting the order to create the ISD-P on the secure element is executed before aid the step of establishing and that the SM-SR is a standard SM-SR.

4. The method according to claim 1, wherein the secure element is an embedded universal integrated circuit card (eUICC).

5. The method according to claim 1, wherein the secure element is an integrated embedded universal integrated circuit card (eUICC).

6. The method according to claim 1, wherein the patch contains at least one signature verified by aid the secure element.

7. The method according to claim 6, wherein at least one signature is verified by a key present in a Mobile Network Operator (MNO) profile.

8. A system to patch an operating system (OS) on a secure element embedded in a terminal, the system comprising:

a secure element comprising an operating system (OS) having thereon an OS patch management system; and a script platform comprising a memory and presenting itself as a standard Subscription Manager Data Preparation (SM-DP) in its interface to a Subscription Manager Secure Routing (SM-SR), wherein the script platform installs a patch in the secure element;

whereby the script platform:

contacts the SM-SR that manages the secure element and requests to create an Issuer Security Domain-Profile (ISD-P) on the secure element;

establishes a secure channel with the ISD-P or the secure element;

performs ISD-P key establishment with the ISD-P on the secure element through the SM-SR, thereby generating a keyset known only by the script platform and the ISD-P to secure one or more scripts;

formats the one or more scripts, adds one or more signed tokens in the one or more scripts, and secures the one or more scripts to produce one or more secured scripts;

sends the one or more secured scripts to the SM-SR which then sends the one or more secured scripts to the secure element;

executes the one or more secured scripts in the ISD-P, wherein the execution of the one or more secured scripts install the patch in the OS; and sends a message informing the script platform of a result of the execution of the one or more secured scripts from the secure element to the script platform.

9. The system of claim 8, wherein the script platform inserts signed tokens into the one or more secured scripts thereby allowing the secure element to verify that the one or more secured scripts have been authorized by one or more actors, selected from the group consisting of:

one token is Digital Letter Of Approval (DLOA), issued by a certification authority, that delivers the DLOA only after verifying compliance, and verified by the certification authority's public key (PK) stored in the secure element's embedded universal integrated circuit card (eUICC) Controlling Authority Security Domain (EC- ASD) to ensure that only secured scripts that have undergone a security certification are executed;

one token is a signature using a shared key or a key pair known only by a secure element manufacturer (EUM) system, and verified with a corresponding PK stored in the secure element's ECASD to ensure that only secured scripts generated by the EUM system are executed;

one token is multiply-signed by each Mobile Network Operator (MNO) which owns a profile installed on the secure element, and verified using a corresponding PK stored in a version number and a key index of the keyset in each ISD-P or MNO profile, to ensure that only secured scripts approved by MNOs involved are executed; and one token is signed by a $3^{rd}$ party's key in a case where the one or more secured scripts are generated by a service provider, and verified using a key stored in the ECASD or in the service provider's security domain to guarantee that only known $3^{rd}$ parties have access to the one or more secured scripts.

10. The system of claim 8, wherein the one or more secured scripts consist of either:

regular Application Protocol Data Units (APDUs), plus optionally proprietary APDUs, secured using Secure Channel Protocol 3 (SCP03); or proprietary commands that are concatenated and secured with Secure Channel Protocol 3t (SCP03t).

11. The system of claim 8, wherein the one or more secured scripts consist of a regular SIMAlliance Profile Package, secured with Secure Channel Protocol 3t (SCP03t), that contains a proprietary Elementary File (EF) which itself contains proprietary commands.

12. The system of claim 8, wherein the one or more secured scripts consist of a regular SIMAlliance Profile Package, secured with Secure Channel Protocol 3t (SCP03t), that contains a PE-NonStandard which itself contains proprietary commands.

13. The system of claim 8, wherein the secure element is selected from the group consisting of an embedded universal integrated circuit card (eUICC) and an integrated eUICC.

\* \* \* \* \*